May 18, 1926. 1,585,414
W. S. PRITCHARD
APPARATUS FOR REMOVING BURRS FROM TUBING
Filed Sept. 11, 1922    5 Sheets-Sheet 1
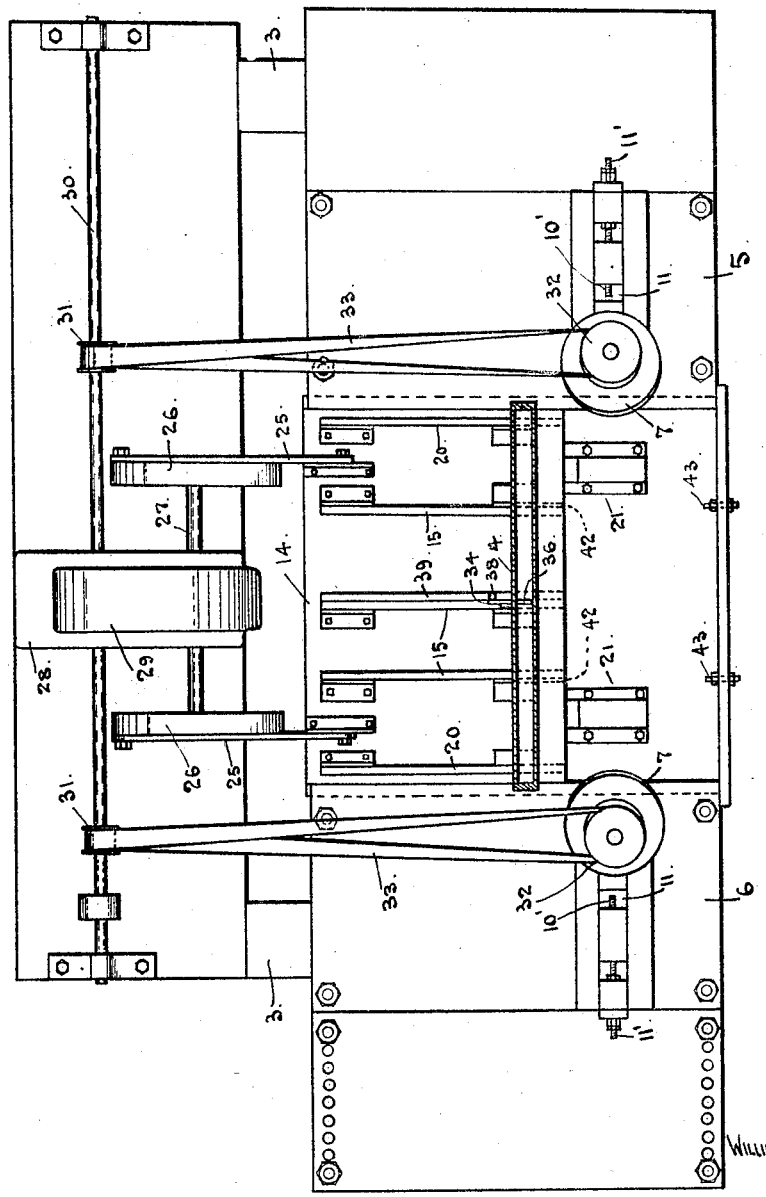

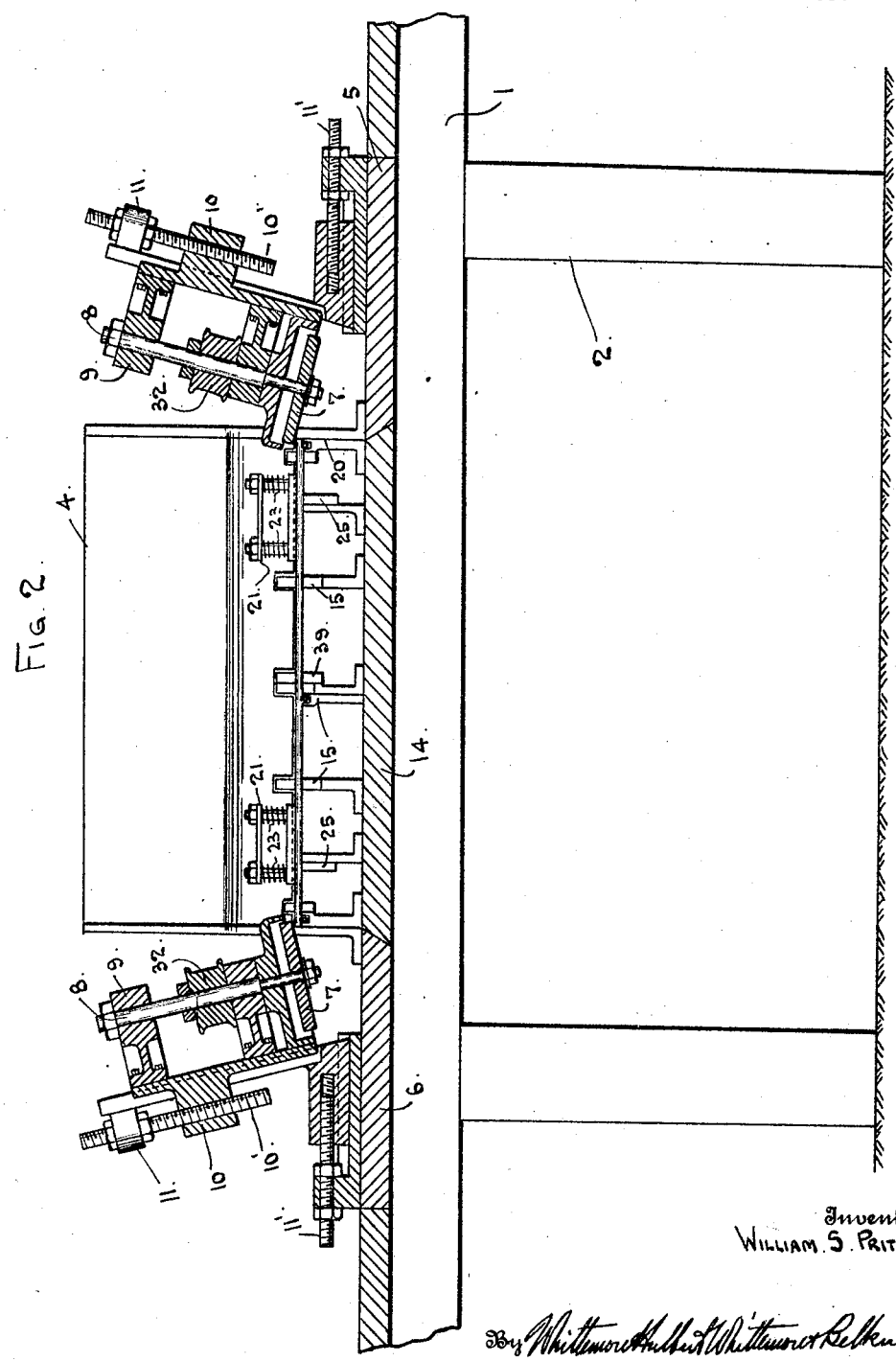

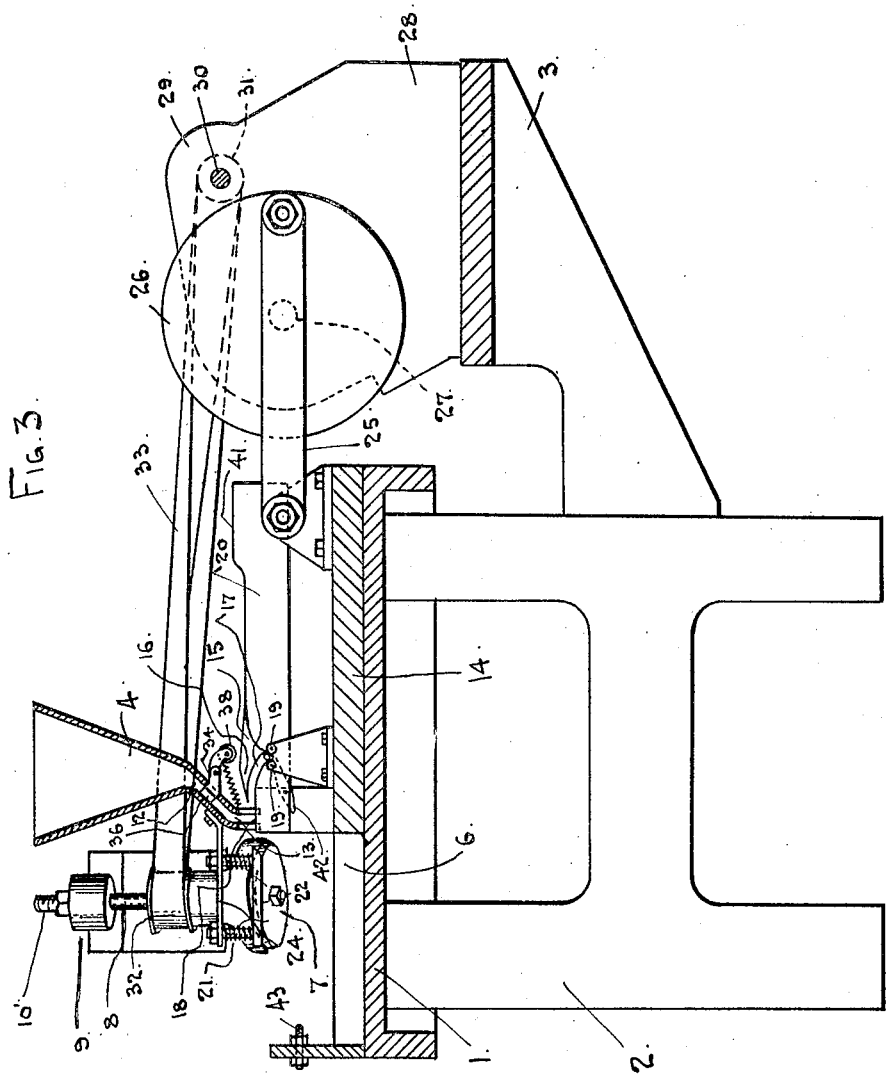

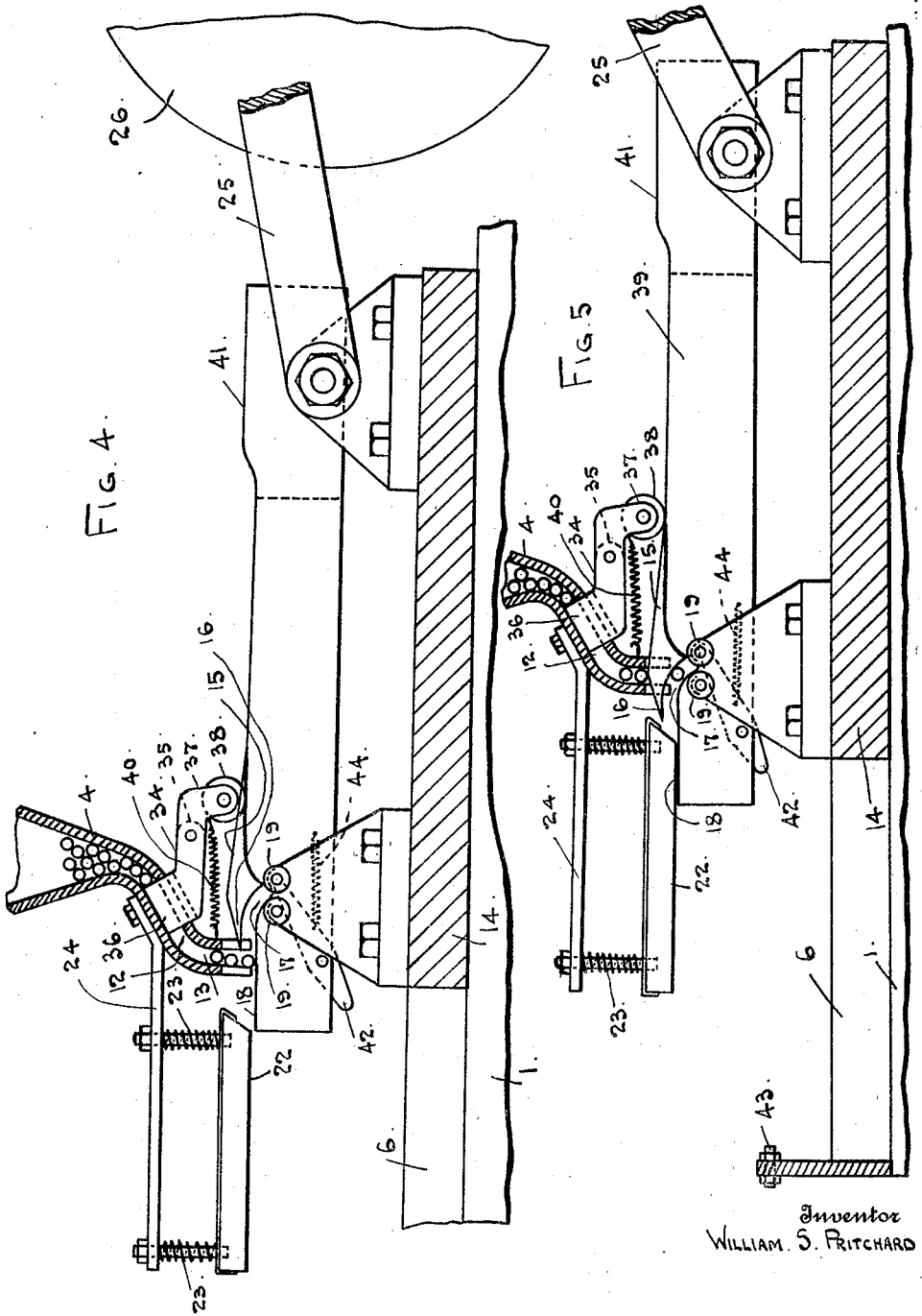

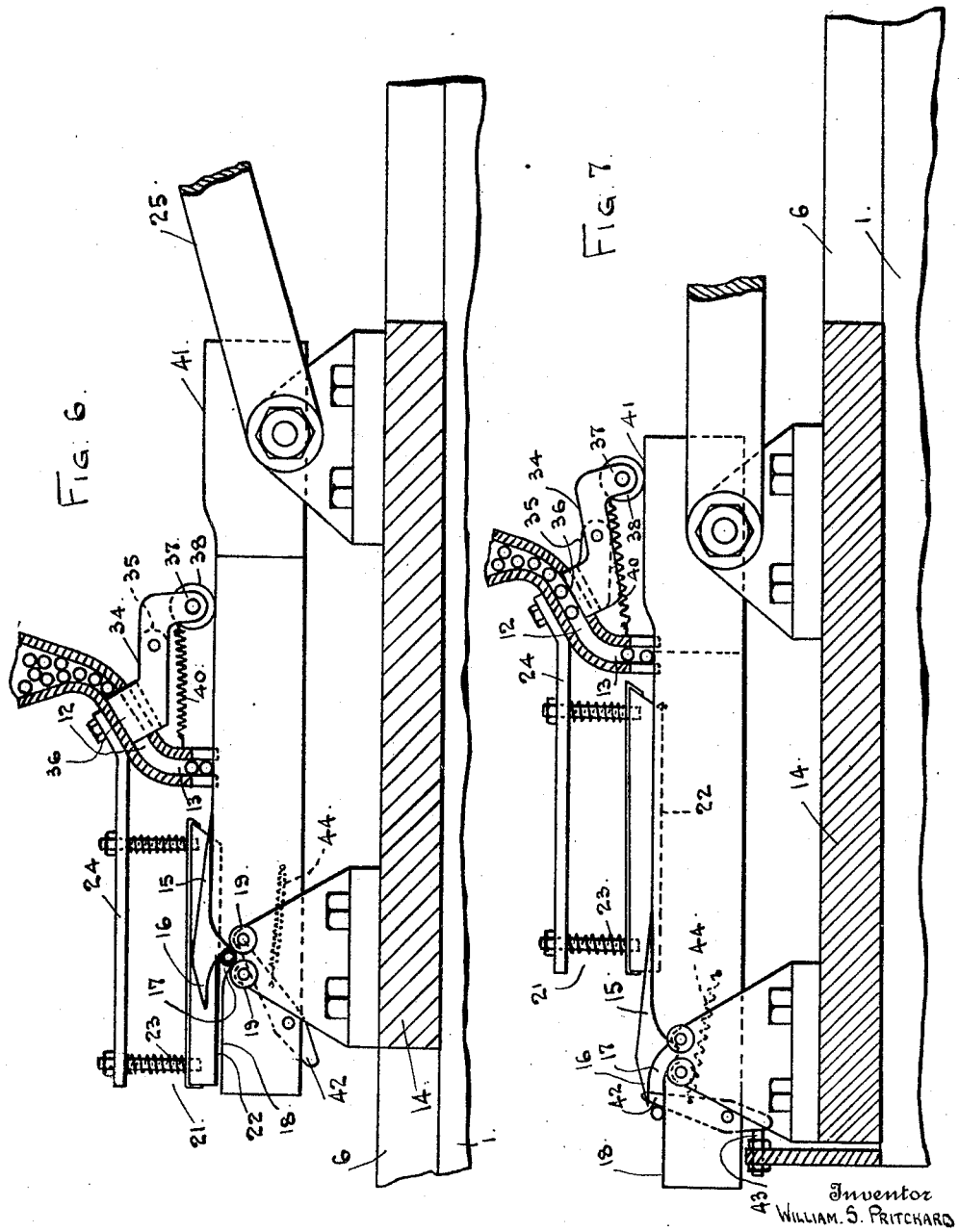

Patented May 18, 1926.

1,585,414

UNITED STATES PATENT OFFICE.

WILLIAM S. PRITCHARD, OF DETROIT, MICHIGAN, ASSIGNOR, BY MESNE ASSIGNMENTS, TO MOTOR PRODUCTS CORPORATION (1926), OF DETROIT, MICHIGAN, A CORPORATION OF NEW YORK.

APPARATUS FOR REMOVING BURRS FROM TUBING.

Application filed September 11, 1922. Serial No. 587,567.

The invention relates to an apparatus for removing burrs from tubing and refers particularly to an apparatus for removing the burrs formed at the ends of tubes by the device for severing these tubes. One of the objects of the invention is to provide a hopper for receiving the tubes after they are severed which has a lateral and downward passage of a width slightly greater than the diameter of the tubes whereby the tubes in passing through the hopper will be compelled to assume a substantially horizontal position. Other objects are to provide means for selecting individual tubes from the hopper and moving the same into engagement with the abrasive means; to provide means for rotating the individual tubes while in engagement with the abrasive means; and to provide means for finally ejecting the individual tubes from the apparatus. Further objects of the invention reside in the novel features of construction and combinations and arrangements of parts as more fully hereinafter set forth.

In the drawings:

Figure 1 is a plan view of an apparatus embodying my invention;

Figure 2 is an end view thereof partly in section;

Figure 3 is a side view thereof partly in section;

Figures 4, 5, 6 and 7 are sectional elevations therethrough showing the parts in different positions.

1 is the table of the machine supported upon the frame 2, and 3 is the support for the driving mechanism carried upon the frame at the rear side thereof. 4 is the hopper for receiving the individual tubes after they have been severed, this hopper being secured at its ends upon the guide plates 5 and 6 which in turn are secured upon the table. The distance between the ends of the hopper is slightly greater than the length of the tubes. 7 are rotary grinding wheels in advance of the ends of the hopper and carried upon the guide plates 5 and 6, these grinding wheels being positioned to operate upon the ends of the individual tubes removed from the hopper.

Each grinding wheel 7 is secured to the lower end of the shaft 8 journalled in the bearings 9, which latter are fixedly secured to the slide 10 adjustable vertically in the support 11 by the screw 10'. This support 11 is slidable horizontally upon its slide plate and is adjustable by the screw 11' in a direction toward and away from the other grinding wheel support. With this arrangement, the grinding wheels are adjustable toward and away from each other as well as vertically. The supports 11 are preferably inclined upwardly and away from each other so that the proper degree of bevel upon the opposite ends of the individual tubes can be secured when using grinding wheels.

For the purpose of compelling the severed tubes to assume substantially horizontal position before emerging from the hopper 4, this hopper is provided with the lateral and downward passage 12 of a width slightly greater than the diameter of the individual tubes, so that the tubes during their gravity descent or passage through the hopper must necessarily assume a substantially horizontal position. This lateral and downward passage terminates in a substantially vertical passage 13 at the discharge end of the hopper.

To remove individual tubes from the hopper and conduct the same past the grinding wheels 7 to be ground thereby, I have provided the following mechanism: 14 is a reciprocable slide upon the table 1 and guided by the guide plates 5 and 6. This slide carries the parallel selecting bars 15 extending longitudinally thereof, each of which is provided with the raised forwardly extending selecting tooth 16 and the downwardly and rearwardly curved groove 17 in its upper edge and at the base of the front face of the tooth, this groove having a width slightly greater than the diameter of an individual tube. The upper edge 18 of each selecting bar in advance of this groove is spaced from the lower edges of the discharge end of the hopper 4 a distance less than the diameter of the individual tubes, thereby preventing the lowermost tube in the discharge passage 13 of the hopper from passing therefrom. The selecting teeth 16 pass through registering transverse slots in the lower edges of the discharge end of the hopper, and the point of each selecting tooth is spaced above the upper forward edge 18 a distance substantially equal to the diameter of an individual tube so that this point will engage between the lowermost tube in the discharge end of the hopper and the tube next above. 19 is a pair of cooperating rotatable rollers at the side of the center selecting bar and positioned to engage the individual tube occupying the groove in the bar. There is also a pair of similar rollers at the side of each auxiliary bar 20 mounted upon the slide 14 near its side edges and parallel to the selecting bars 15, these pairs of rollers cooperating with the pair of rollers 19 to carry the individual tubes upon leaving the hopper. The bars 20 pass through registering transverse slots in the lower edges of the discharge end of the hopper, but the points of their teeth are preferably lower than those of the teeth 16 to provide for removing and advancing an individual tube which has become bent. The grinding wheels 7 are adjusted to proper height with respect to these three pairs of rollers to remove the desired amount of metal at the ends of the individual tubes as they pass the grinding wheels.

To compel the individual tubes to rotate about their axes and upon the rollers while passing the grinding wheels 7, I have provided the friction members 21 secured to the hopper 4 and located in advance thereof, these friction members having resilient lower bearing blocks 22 engageable with the upper surfaces of the individual tubes and frictionally holding the same so that they will rotate during their passage therealong. The bearing blocks are preferably formed of rubber and are resiliently forced downward by means of coil springs 23 between the bearing blocks and the arms 24 forming the supports secured to the hopper.

The slide 14 is reciprocated by means of the connecting rods 25 pivotally connected to its rear end and to the fly wheels 26 which are mounted upon the shaft 27 journalled in the frame 28 upon the support 3. The shaft is driven by means of suitable worm gearing in the housing 29 which in turn is driven from the shaft 30 also journalled in the frame 28, this shaft being driven from an electric motor. This electric motor also rotates the grinding wheels 7 by means of the pulleys 31 upon the shaft 30, the pulleys 32 upon the shafts 8, and the belts 33.

To limit the downward movement of the individual tubes through the restricted passages 12 and 13 of the hopper, I have provided the dog 34 pivotally mounted upon the bracket 35 which is secured to the rear wall of the hopper. This dog has a nose 36 adapted to extend through a slot in the rear wall of the lateral and downward passage 12 and substantially across this passage, and has a downturned end 37 to which is journalled a roller 38 adapted to engage the upper edge of the cam bar 39 secured to the center selecting bar 15, the forward portion of this edge having a contour to present no interference with the movement of the individual tubes from the hopper. This roller is held in engagement with this upper edge by means of the coil spring 40. The rear portion 41 of the upper edge is at a slightly greater elevation so that when the selecting bar is near the forward limit of its movement, this rear elevated portion coming into engagement with the roller 38 swings the dog about its pivot moving its nose out of the passage 12 and allowing downward movement of the individual tubes under the action of gravity.

For the purpose of ejecting the individual tubes from the downwardly and rearwardly curved slots in the selecting and auxiliary bars there are ejector bars 42 pivoted upon a pair of selector bars 15 and normally having their ejecting ends extending rearwardly and below the individual tube carried by the pairs of rollers. Also there is an adjustable stop 43 for each ejector bar positioned in the front rail of the table and adapted to engage the lower forward end of the ejector bar during the final forward movement of the slide and compel the rotation of the ejector bar, which forcibly removes the individual tube. Upon return of the slide, a coil spring 44 returns the ejector bar to normal position, which is determined by a stop with which the ejector bar comes into contact.

For the purpose of adjusting the apparatus to take care of tubes of different lengths, the guide plate 6 is adjustable toward and away from the guide plate 5 upon the table 1, the table being provided with a series of apertures therethrough for alternative engagement in by the bolts securing the guide plate to the table. Also, hoppers of different length are provided to be secured upon the guide plates. Furthermore, slides 14 of different width are provided having the same arrangement of bars and the like, but spaced at different distances from each other.

In operation, assuming the parts to be in position indicated in Figure 3 in which the selecting bars are in their rearmost position and in which tubes occupy the discharge passage in the hopper and the lowermost tube is resting upon the upper edges of the selecting bars in advance of the selecting teeth; upon forward movement of the slide carrying the selecting bars, the points of the selecting teeth of these bars pass through the transverse slots in the discharge end of the hopper and between the lowermost tube and the tube next above as shown in Figure 4, this lowermost tube then falling into the downward and rearwardly curved grooves in the upper edges and resting upon the rollers of the selecting bars as well as the auxiliary bars as indicated in Figure 5 at which time they will clear the lower edges of the hopper. Continued forward movement of the slide carries the individual tube mounted upon the pairs of rollers below the friction members and in engagement with the lower faces of their friction blocks, compelling the rotation of the individual tubes, this being shown in Figure 6. While this tube is being positively rotated, it passes below the rotating grinding wheels and the roughened ends are removed and bevelled thereby. Then, as the slide approaches its forward limit of travel, the ejectors come into engagement with the stops upon the table and are rotated, thereby forcibly moving the tube out of the grooves in the selecting and auxiliary bars and ejecting the same from the apparatus, this being shown in Figure 7. At this time, the rear elevated portion of the upper edge of the cam bar has come into engagement with the rollers upon the dog and caused the swinging of the dog to move its nose out of the lateral and downward passage in the hopper and permit of the downward passage of tubes therethrough. Then return movement of the slide brings the parts back into the positions shown in Figure 3.

Although I have shown and described the bur removing devices as rotary grinders, it is obvious that other devices such as milling cutters may be used.

What I claim as my invention is:

1. In an apparatus for removing burrs from tubing, the combination with abrasive means, of a member movable through a path adjacent to said abrasive means, anti-friction means carried upon said member for supporting a transversely extending tube and carrying the same into engagement with said abrasive means, and means frictionally engaging the side of the tube opposite that engaged by said anti-friction means for compelling the rotation of the tube about its axis during its engagement with said abrasive means.

2. In an apparatus for removing burrs from tubing, the combination with a reciprocable member, of bars thereon adapted to engage a tube and advance the same, a rotary abrasive member positioned to engage the tube during its advancement, pairs of rollers upon said reciprocable member supporting said tubes, and a friction member engageable with the upper surface of the tube during its engagement with said abrasive member for compelling the rotation of the tube upon said rollers.

3. In an apparatus for removing burrs from tubing, the combination of a hopper for receiving the tubes and provided with means for compelling the tubes passing therethrough to assume a parallel relation, an abrasive member, and reciprocating means for selecting individual tubes in said hopper and moving the same into engagement with said abrasive member.

4. In an apparatus for removing burrs from tubing, the combination with a hopper for receiving the tubes having a lateral and downward passage of a width slightly greater than the diameter of one of the tubes, of abrasive means, and means for removing a tube from said passage into engagement with said abrasive means.

5. In an apparatus for removing burrs from tubing, the combination with a hopper for receiving the tubes having a lateral and downward passage of a width slightly greater than the diameter of one of the tubes, of abrasive means, means for removing a tube from said passage into engagement with said abrasive means, and means for rotating the tube about its axis while in engagement with said abrasive means.

6. In an apparatus for removing burrs from tubing, the combination with a hopper having a downwardly extending discharge passage of a width slightly greater than the diameter of a tube, the lower ends of the side walls of said passage having transverse registering slots therethrough, of a reciprocable selecting bar having a downwardly and rearwardly curving groove in its upper edge of a width greater than the diameter of a tube, and a selecting tooth reciprocable through said aligned slots and having its point located above the adjacent upper edge of said selecting bar a distance slightly greater than the diameter of a tube, and a grinding device positioned to engage the periphery of a tube in said groove during its movement away from said hopper.

7. In an apparatus for removing burrs from tubing, the combination with a hopper having a downwardly extending discharge passage of a width slightly greater than the diameter of a tube, of a horizontally reciprocable selecting bar with a groove in its upper edge for receiving the lowermost tube in said discharge passage and advancing the same from said hopper, a rotary grinder positioned to engage the periphery of the tube carried by said bar during its advancement from said hopper, and means for ejecting the tube from the groove in said bar after the tube has passed said grinder.

8. In an apparatus for removing burrs from tubing, the combination with a hopper having a downwardly extending discharge passage of a width slightly greater than the diameter of a tube, the lower ends of the side walls of said passage having transverse registering slots therethrough, of a reciprocable selecting bar having a downwardly and rearwardly curving groove in its upper edge of a width greater than the diameter of a tube, and a selecting tooth reciprocable through said aligned slots and having its point located above the adjacent upper edge of said selecting bar a distance slightly greater than the diameter of a tube, a grinding device positioned to engage the periphery of a tube in said groove during its movement away from said hopper, and means carried upon said bar for ejecting the tube from the groove after the tube has passed said grinding device.

9. In an apparatus for removing burrs from tubing, the combination with a hopper for receiving tubes provided with a downwardly extending passage of a width slightly greater than the diameter of a tube, of reciprocable means for selecting individual tubes and advancing the same away from said hopper, abrasive means engageable with the peripheries of the individual tubes at their ends during the advancement thereof, and means controlled by said reciprocable means for limiting the downward movement of the tubes into said downwardly extending discharge passage.

10. In an apparatus for removing burrs from tubing, the combination with a hopper having a lateral and downward passage terminating in a substantially vertical discharge passage, said passages being of a width slightly greater than the diameter of a tube, of abrasive means engageable with the peripheries of the individual tubes near their ends, reciprocable selecting bars for selecting individual tubes and advancing the same away from said hopper into engagement with and past said abrasive means, and a dog pivotally mounted upon said hopper and having a nose adapted to extend across said lateral and downward passage therein, movement of said dog being controlled by said reciprocable member.

11. In an apparatus for removing burrs from tubing, the combination with a hopper having a downwardly extending discharge passage of a width slightly greater than the diameter of a tube, the lower ends of said side walls of said passage having transverse registering slots therethrough, of a reciprocable selecting bar provided with a recess for receiving a tube and with a selecting tooth reciprocable through said aligned slots and having its point located above the adjacent upper edge of said selecting bar a distance slightly greater than the diameter of a tube, and an abrasive member positioned to engage the tube in said recess during its movement away from said hopper.

12. In an apparatus for removing burrs from tubing, the combination with a hopper having a discharge passage, of a reciprocable selecting member provided with a recess for receiving a tube from said discharge passage and advancing the same from said hopper, an abrasive member positioned to engage the tube carried by said reciprocable member during its advancement from said hopper, and means carried by said reciprocable member for ejecting the tube from the recess after the tube has passed said abrasive member.

In testimony whereof I affix my signature.

WILLIAM S. PRITCHARD.